(No Model.)

W. F. KAUSEN.
LIQUID COOLER.

No. 504,590. Patented Sept. 5, 1893.

Witnesses
John Shaw.
Geo. F. Kincaid

Inventor
Will. F. Kausen
by John Wedderburn
his Attorney

UNITED STATES PATENT OFFICE.

WILLIAM F. KAUSEN, OF FERNDALE, CALIFORNIA.

LIQUID-COOLER.

SPECIFICATION forming part of Letters Patent No. 504,590, dated September 5, 1893.

Application filed November 19, 1892. Serial No. 452,563. (No model.)

*To all whom it may concern:*

Be it known that I, WILLIAM F. KAUSEN, of Ferndale, in the county of Humboldt and State of California, have invented certain new and useful Improvements in Liquid-Coolers; and I do hereby declare the following to be a full, clear, and exact description of the invention, such as will enable others skilled in the art to which it appertains to make and use the same.

My invention is an improvement in liquid coolers designed for its simplicity, cheapness and durability of construction and efficiency and certainty of operation.

I have set forth fully hereinafter the details of construction and the essential features of my invention, and illustrated them in the accompanying drawings, in which similar letters of reference designate corresponding parts.

Figure 1:
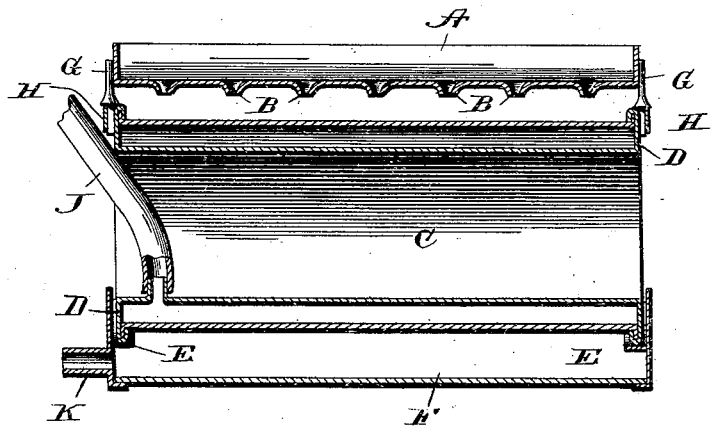
Figure 2:
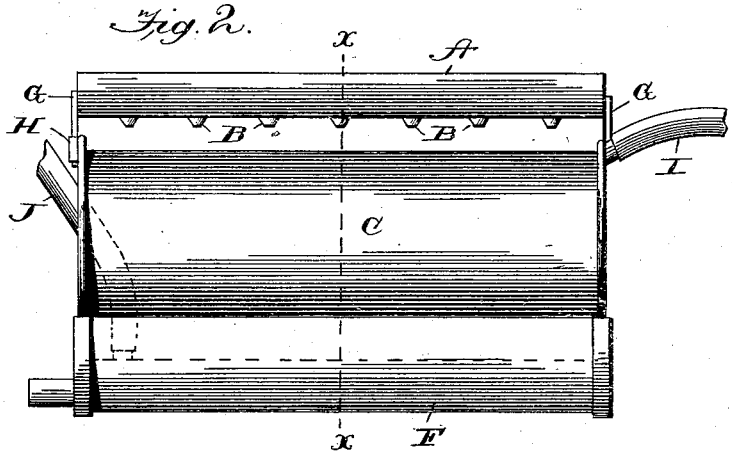
Figure 3:
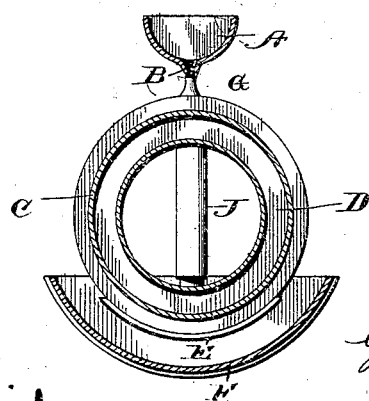

Figure 1 is a sectional view of my improved cooler. Fig. 2 is a vertical elevation of the same, and Fig. 3 is a section through the line $x$—$x$ Fig. 2.

A is a pan with a semi-circular cross-section, the bottom of which is perforated with a series of holes B.

Directly below the pan A is the double cylinder C, the inner and outer casings of which are connected by the ends D. The cylinder C rests on flanges E in the semi-circular pan F.

At the ends of the pan A and projecting downward are the arms G, which fit into corresponding recesses H in the upper portion of the cylinder C.

To prevent the liquid from following the under surface of the pan A, I have constructed the holes B as represented in the drawings viz: countersunk and then perforated.

The operation of my device is as follows: The liquid to be cooled is conveyed into the pan A, whence it issues through the holes B and passes over the outer casing of the cylinder C through which a constant circulation of cooling liquid takes place, as the liquid is passed into the cylinder through the pipe I and issues therefrom through the pipe J. After the liquid to be cooled reaches the bottom of the outer casing of C it drops therefrom into the receptacle F, from which it is drawn off through the pipe K. To prevent the accumulation of air in the upper part of the cylinder C, I have inclined the pipe J upward. The pipes communicating to and from the cylinder C are made of rubber or other suitable material.

My invention is especially adapted to cool cream after coming from the separator, and besides cooling the cream, it so aerates it that it can be made into a much better class of butter.

The construction and arrangement of the several parts of my cooler being thus made known, the operation and the advantages of the same will, it is thought, be readily understood.

I am aware that changes in the form and proportion of parts of the device herein shown and described as an embodiment of my invention can be made without departing from the spirit or sacrificing the advantages thereof, and I therefore reserve the right to make such changes and alterations as fairly fall within the scope of my invention.

Having thus fully described my invention, what I claim, and desire to secure by Letters Patent, is—

The liquid cooler described, consisting of the pan with perforated bottom, the double cylinder below said pan, ends connecting the inner and outer casings of said cylinder, a semi-circular pan having flanges on which the said cylinder rests, the arms on the ends of the pan fitting in recesses in the double cylinder, and the inclined pipe leading into the inner portion of the double cylinder, substantially as shown and described.

In testimony whereof I have signed this specification in the presence of two subscribing witnesses.

WILLIAM F. KAUSEN.

Witnesses:
E. G. EASTMAN,
R. A. SIMPSON.